Feb. 26, 1952     B. P. TUGGLE     2,587,012
GOLD SEPARATOR
Filed Nov. 17, 1948
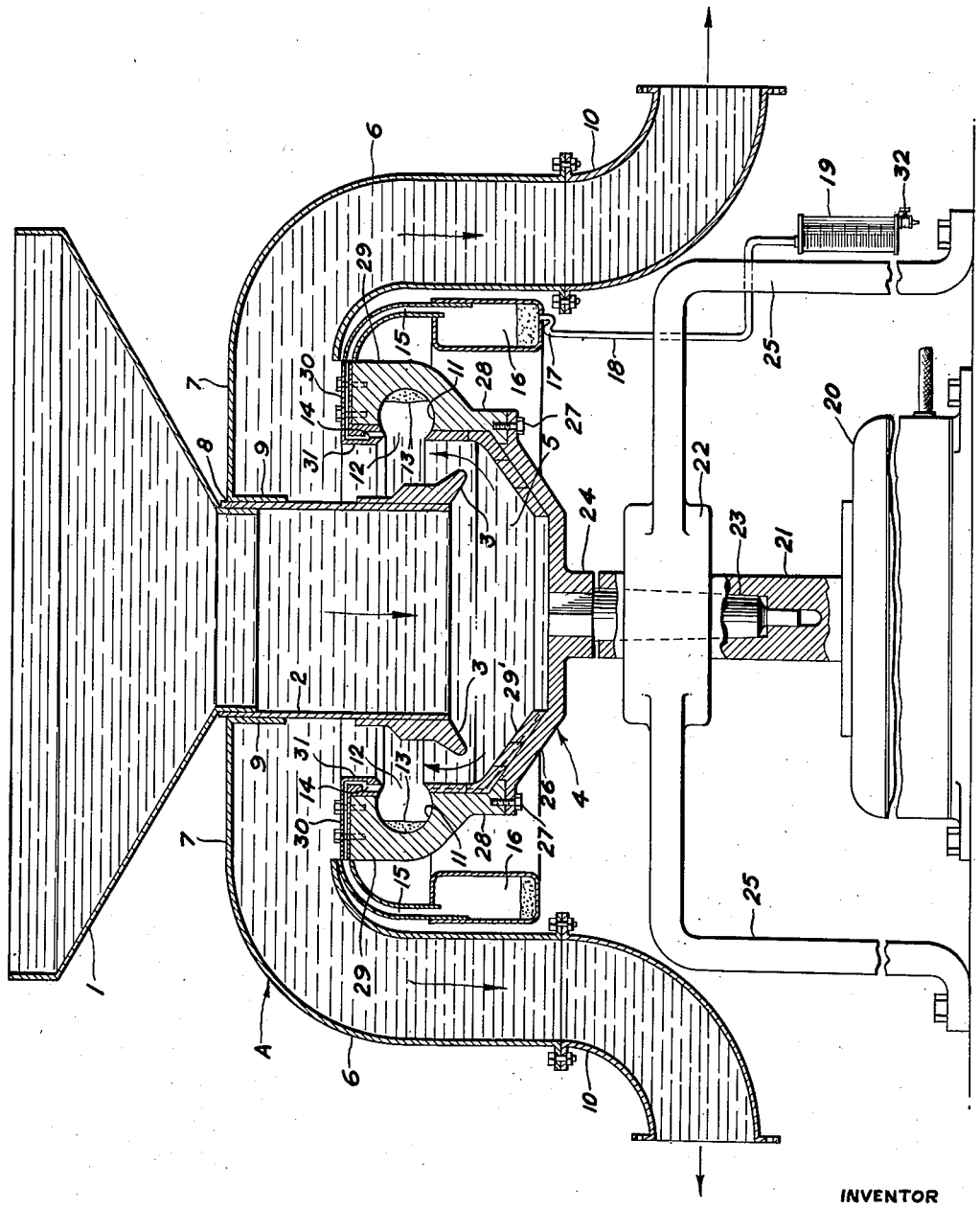
INVENTOR
*Benjamin P. Tuggle*
BY *Shreve, Crowz + Gordon*
ATTORNEYS Patented Feb. 26, 1952

2,587,012

UNITED STATES PATENT OFFICE 2,587,012

GOLD SEPARATOR

Benjamin Pinkney Tuggle, Atlanta, Ga.

Application November 17, 1948, Serial No. 60,428

1 Claim. (Cl. 209—199)

The present invention relates to devices for separating finely-divided gold from gold bearing liquids in which the gold is carried in finely-divided form. This finely-divided gold, which is adapted to be recoverd by the process of this invention ranges down to colloidal sizes, and the apparatus is adapted primarily for the recovery of "flour gold" or colloidal gold, the recovery of which up to now, has been commercially unfeasible.

The present invention represents an improvement over my prior Patent No. 1,235,945, dated August 7, 1917, for a Gold Separator, and it embraces means for impinging by means of centrifugal force, the fine particles of gold upon a surface of mercury, with which the gold forms an amalgam, from which it may be subsequently extracted, and means for feeding to the device the gold-containing material and for removing the waste material therefrom. The finely divided gold adapted to be treated and recovered from the improved apparatus may have its origin in effluent from stamp mills, in colloidal gold-bearing waters, or from any other source wherein the gold is in finely divided or colloidal form.

One object of the present invention is to provide an improved method and apparatus for recovering finely divided or colloidal gold, which otherwise is not amenable to commercial recovery from water or solutions containing such gold, the recovery being effected rapidly and in line with full commercial economies.

A further object of the invention is to provide an improved centrifugal separator for causing concentration of uniformly disseminated colloidal gold in predetermined portions of the equipment, together with means for rapidly collecting the concentrated gold in an efficient and expeditious manner and in a form in which it can be recovered readily in marketable form.

A still further object of the invention is to provide a gold separating and recovering apparatus of the above-indicated character wherein there are included means for directly indicating the amount of gold being recovered from the materials being treated.

A still further object of the invention is to provide an improved method and apparatus for continuously recovering colloidal gold from gold-bearing waters or solutions in which colloidal gold is carried and in which the gold is not amenable to usual recovery operations.

Further objects of the invention will become apparent as the description proceeds, and the features of novelty will be pointed out in particularity in the appended claim.

The invention will be understood more clearly by reference to the accompanying drawing, which illustrates an exemplary embodiment of the invention.

The figure is a diagrammatic sectional elevation of the improved gold separator device forming the subject matter of this invention.

In the illustrated embodiment characterizing this invention there is shown a gold separator device or apparatus A and the reference numeral 1 represents a hopper or funnel-shaped intake for the colloidal gold-bearing water that is fed into the apparatus through a centrally disposed feed pipe 2 of relatively large diameter and, in the upper end of which, said funnel member 1 is detachably seated. Agitating and dispersing blades or vanes 3 are secured to the lower or inner end of the feed pipe 2 in equi-spaced relation and extend downwardly and outwardly at an angle therefrom to a point about midway of a rotatable bowl 4 adapted, during the operation of the separator, to be continuously filled with the gold-bearing water 5 in which said vanes 3 are immersed. The stripped water is directed from the device A through the outlet pipes 6 communicating with said device adjacent to the top thereof, this portion being a dome-like head 7 cooperating with the centrifugal bowl 4, said outlets in part being continuations of said dome, which latter is formed with a central opening 8 surrounded by an integral depending flange 9 in which is suitably secured the upper end of the feed pipe 2. With this construction the water may be continuously discharged from the bowl 4 through the opposite pipes 6, and there may be similar additional equi-spaced pipes added or said dome structure may be formed with a continuous annular water discharge outlet in the general form of said pipes, as will be well understood. In the present instance, said outlets 4 are provided with the detachable elbow sections 10 for attachment to additional sections in accordance with particular operating requirements as desired.

The improved separator invention comprises said rotating centrifugal bowl 4 which receives the gold-bearing waters from the feed pipe 2, and the inner periphery of said bowl is provided with an annular, substantially circular recess 11 which is formed with an annular passage 12 communicating with the interior of the bowl 4 at a point spaced from its upper edge for receiving gold-containing water driven through opening 12 by the centrifugal force set up by the rotation of said bowl, said annular recess 11 being adapted to contain and retain a body of mercury which amalgamates with the gold that is driven therein.

As the concentrated gold enters and alloys with the mercury, the volume of the latter is increased commensurately with the amount of gold concentrates therein. Since the recess is filled with mercury, the increase in volume due to formation of the mercury-gold amalgam 13 causes an overflow from the recess or channel 11, this overflow passing upwardly from said recess, just before it reaches the opening 12 through an annular riser passage 14 and across the upper end of the rotating bowl, and thence into a registering passage 15 and into the annular mercury receiver 16. A mercury trap 17 communicates with the receiver 16, and leads through a pipe 18 into a graduated transparent cylinder 19 in which the increase in volume of the mercury may be noted, this increase being due to gold which has been concentrated in the mercury.

The centrifugal bowl 4 is adapted to be rotated at a high speed, for instance at approximately 1200 R. P. M. by a suitable motor 20, which drives shaft 21, that operates in a self-oiling anti-friction bearing box 22, the bowl 4 having a shaft 23 which extends into said motor shaft 21, the latter forming a sleeve for said depending bowl shaft 23 the upper end of which is keyed or otherwise secured in boss 24 and similarly in shaft 21. In practice the motor 20 may be a three-horsepower, 3-phase, 60 cycle-220 volt motor, but the particular size of the motor depends upon the capacity of the bowl 4 and the speed of rotation thereof. The bearing box 22 may be supported on a suitable frame 25.

In operation, the high speed rotation of the water in the bowl 4 drives the colloidal gold under the action of centrifugal force to the outer periphery of the bowl, the rotating stream being dispersed and agitated by the stationary blades or vanes 3 and directed into the recess 11.

It will be seen from the drawing that the centrifugal bowl 4 is composed of a bottom member 26, secured by cap screws 27 to the side or wall portion 28, the upper thickened portion 29 of which contains the recess 11. The bottom member 26 and the side member 28 are reinforced by a liner 29 which bridges the jointure between members 26 and 28 which above opening 12 is in the form of the annular complemental L-shaped plates 30 and 31 formed in a manner such that when they are secured to the upper end of the bowl portion 29 they will form the riser amalgam passage 14 off-set at its inlet mouth so as to communicate with the recess 11 just inwardly of its opening 12 so that the overflow of the amalgam 13 into said inlet mouth will not be in the path of the water flow through said opening 12, thereby not only insuring a smooth uninterrupted flow of said amalgam but, also, preventing loss of the latter during operation of the device and which is very important. When the process has been completed or the mercury in the annular recess or channel 11 has become saturated with gold, the mercury is drained therefrom, as through a cock 32 and retorted in accordance with standard procedure to recover the gold, the mercury being condensed for re-use. The stripped water passes continuously to the pipes or annular umbrella or dome-like outlets 6 where it passes to final disposal.

It will be understood that the "water" herein treated, will be either natural water bearing colloidal gold, or chemical solutions from stamping mills or other gold-treating equipment in which gold is present in finely-divided or colloidal condition.

In operation, water is introduced into the separator through the funnel inlet 1 for the gold-bearing water and enters the rotating bowl 4 through the feed pipe 2. As the bowl 4 whirls at high velocity, the incoming water is agitated and predeterminedly directed through opening 12 by the vanes 3 so that the gold contained in the water is concentrated in the annular recess 11, in which is retained the body of mercury which serves as collector for the gold. As the gold collects in the mercury, the volume of the mercury is increased by the amount of gold concentrated therein. The increased volume of the amalgam is displaced from the recess 11, and passes upwardly through the annular passage 14, and thence flows into the annular passage 15, and thence into the receiver 16. The mercury drains from the receiver 16 into the graduated cylinder 19, which indicates the increased volume of the mercury due to the gold absorbed therein. Stopcock 32 drains the amalgam from the annular receiver 16 or the plate 30 may be removed permitting ready recovery of the amalgam 13 and/or cleaning of said passage. The stripped water passes continuously through the annular outlet means 6 of the dome-like head of the separator at a rate commensurate with the rate of stripping and the rate of speed of the gold-bearing water into the centrifugal bowl. The mercury contained in the recess 11 is replaced as rapidly as it becomes saturated with the gold concentrated in the mercury. The operation is continuous, except for the intermittent and periodic withdrawal of the gold-bearing amalgam, which is withdrawn as the mercury becomes saturated with gold, and the amalgam then is retorted in accordance with usual practice to distill off the mercury which is recovered for re-use, and the gold separated therefrom is collected.

While the apparatus herein described and illustrated in the accompanying drawings is the preferred embodiment of the apparatus employed in practicing the present invention, it will be understood that the structural details may be varied without departing from the scope of the invention, as will become apparent to one skilled in the art, and accordingly it will be understood that it is intended and desired to embrace within the scope of this invention such modifications and changes as may be necessary to adapt it to varying conditions and uses, as defined by the appended claim.

What is claimed is:

A centrifugal gold separator comprising a rotatable multiple-piece bowl member adapted to receive gold-bearing water to be treated, and including a bottom bowl, an annular thickened side member mounted on the bottom bowl, an annular reinforcing liner for the thickened side member extending over and beyond the juncture between the thickened side member and the bottom bowl, and securing means for securing the side member and bottom bowl together, a dome-like head covering the resulting bowl assembly, means in the head for supplying gold-bearing water to the bowl assembly, an annular substantially circular recess extending around the inner periphery of the thickened side of the bowl assembly, the said recess having a restricted annular orifice opening through the reinforcing liner of the assembly, a body of mercury contained in the recess, the said recess communicating through the said restricted orifice with the interior of the bowl assembly for receiving gold concentrated from the water by centrifugal action, oppositely disposed discharge means in the head for continuously discharging stripped water from the bowl, means including riser passages in the said reinforcing liner communicating with the annular circular recess, for continuously withdrawing gold amalgam from the recess commensurate with the rate of formation thereof, deflector blades on the supplying means mounted adjacent to and in opposition to the said restricted orifice of the annular recess for directing gold bearing water and mercury from the bowl assembly into the annular recess, means for indicating the amount of gold concentrated in the amalgam produced in the bowl assembly and annular recess, means for draining gold amalgam from the receiving means and indicating means, and means for rapidly rotating the bowl member.

BENJAMIN PINKNEY TUGGLE.

REFERENCES CITED

The following references are of record in the file of this patent:

UNITED STATES PATENTS

| Number | Name | Date |
|---|---|---|
| 604,978 | Garland | May 31, 1898 |
| 1,456,737 | Lapham | May 29, 1923 |
| 1,746,789 | Neumann | Feb. 11, 1930 |
| 2,146,716 | Bennett | Feb. 14, 1939 |
| 2,217,062 | Lewis | Oct. 8, 1940 |